United States Patent
Chinnappa Reddy et al.

(10) Patent No.: US 12,492,834 B2
(45) Date of Patent: Dec. 9, 2025

(54) DEVICE AND SYSTEM FOR CREATING AIR CAPSULES AROUND PASSENGERS IN VEHICLES AND METHOD THEREOF

(71) Applicant: HCL Technologies Limited, New Delhi (IN)

(72) Inventors: Ganga Reddy Chinnappa Reddy, Bangalore (IN); Vinod Kumar Srinivasa, Bangalore (IN); Manu Mohan, Bangalore (IN)

(73) Assignee: HCL Technologies Limited, New Delhi (IN)

( * ) Notice: Subject to any disclaimer, the term of this patent is extended or adjusted under 35 U.S.C. 154(b) by 512 days.

(21) Appl. No.: 17/039,058

(22) Filed: Sep. 30, 2020

(65) Prior Publication Data
US 2022/0057094 A1     Feb. 24, 2022

(51) Int. Cl.
*B60H 1/24*     (2006.01)
*F24F 9/00*     (2006.01)

(52) U.S. Cl.
CPC ............... *F24F 9/00* (2013.01); *B60H 1/247* (2013.01)

(58) Field of Classification Search
CPC ...... F24F 9/00; F24F 2009/007; B60H 1/247; B60H 1/24; B60H 1/34; B60H 1/3442; B60H 1/345; B60H 1/3457; B60H 2001/3485
USPC .......................................................... 454/189
See application file for complete search history.

(56) References Cited

U.S. PATENT DOCUMENTS

| | | | | |
|---|---|---|---|---|
| 3,629,999 | A * | 12/1971 | Marsh | F24F 8/10 55/DIG. 29 |
| 6,189,831 | B1 * | 2/2001 | Asai | B64D 11/0023 454/76 |
| 9,725,178 | B2 * | 8/2017 | Wang | G06F 30/15 |
| 2004/0211161 | A1 * | 10/2004 | Avery | B01D 46/10 55/385.1 |
| 2009/0311951 | A1 * | 12/2009 | Walkinshaw | F24F 13/26 96/60 |
| 2021/0387737 | A1 * | 12/2021 | Harcup | B64D 13/00 |
| 2022/0063814 | A1 * | 3/2022 | Vandyke | B60J 9/04 |

FOREIGN PATENT DOCUMENTS

GB          1015575 A  *  1/1966   ............... A47L 5/22

OTHER PUBLICATIONS

Harcup, Anthony, 63037310.pdf, "Passenger Air Shield", Jul. 2020, pp. 1-37.*

* cited by examiner

*Primary Examiner* — Avinash A Savani
*Assistant Examiner* — Ryan L Faulkner
(74) *Attorney, Agent, or Firm* — Kendal M. Sheets

(57) ABSTRACT

A device, system, and method for creating air capsules enclosing passengers in vehicles is disclosed. The device for creating air capsules enclosing passengers in vehicles includes an attachment portion. The attachment portion is removably attached to a gasper within a vehicle and receives airflow from an outlet port of the gasper. The device further includes a diffuser portion integrated with the attachment portion. The diffuser portion is configured to intake the airflow from the attachment portion. Further, the diffuser portion includes a flow control portion configured to generate at least one airflow stream from the airflow. A first airflow stream of the at least one airflow stream creates an air capsule configured to enclose a passenger in the vehicle.

8 Claims, 10 Drawing Sheets

DEVICE AND SYSTEM FOR CREATING AIR CAPSULES AROUND PASSENGERS IN VEHICLES AND METHOD THEREOF

TECHNICAL FIELD

This disclosure relates generally to preventing pathogen transmission, and more particularly to a system, device, and method for creating air capsules around passengers in vehicles.

BACKGROUND

In the current times, because of the recurring pandemics, for example Ebola, Influenza, Severe Acute Respiratory Syndrome (SARS), and now, COVID-19, almost every field has been affected socially as well as economically. Today, because of the outbreak of COVID-19, otherwise known as corona virus, the only available means to prevent the spread of corona virus is by maintain social distance and by avoiding mass gatherings. This has negatively impacted tourism and travel industry, which is already having a huge social and economic issues on various countries. The impact has been more on the travel industry, since travelling in a packed vehicle cabin may boost the rate of spread of corona virus. Therefore, in such times, travel is either interrupted, restricted, or is completely banned in order to avoid spread of the virus.

Nevertheless, for many, travel is inescapable even when the vehicle cabins are densely packed, which ultimately results in increasing the chances of disease transmission. This is because contagious diseases (for example, COVID-19) are transmitted when a passenger inhales pathogens expelled or exhaled by an infected co-passenger. Thus, during the time of pandemics, a safe landing at the destination point may not be the only safety concern. It therefore becomes important to flush out air exhaled by each passenger before it reaches any co-passenger. In other words, when an infected passenger sneezes, coughs, or exhales air, a high velocity air jet that includes infectious air particles comes out of his mouth or nose, thereby causing the infectious air particles to be inhaled by co-passengers present inside the same vehicle cabin, especially ones who are in close vicinity of the infected passenger.

In the present state of art, gaspers are used to provide adequate oxygen and thermal comfort to passengers. The gaspers may supply cool air and oxygen at an estimated level to keep the passengers in comfort. Also, conventionally, various sanitization techniques are used to ensure controlling spread of pathogen within a vehicle cabin. Some of the conventional techniques that are used to avoid spread of pathogens include, but are not limited to filters, for example, High Efficiency Particulate Air (HEPA) filters. However, these existing sanitization techniques in combination with gaspers do not discharge the pathogens out of the vehicle cabin. Further, these existing techniques may require high installation and maintenance cost and are not much efficient.

There is, therefore, a need for devices, systems, and methods that prevent transmission of pathogenic microorganisms within vehicles.

SUMMARY

In one embodiment, a device for creating air capsules enclosing passengers in vehicles is disclosed. In one example, the device may include an attachment portion configured to removably attach to a gasper within a vehicle and receive airflow from an outlet port of the gasper. The device may further include a diffuser portion integrated with the attachment portion. The diffuser portion may be configured to intake the airflow from the attachment portion. Further, the diffuser portion may include a flow control portion configured to generate at least one airflow stream from the airflow. It should be noted that a first airflow stream of the at least one airflow stream may create an air capsule configured to enclose a passenger in the vehicle.

In another embodiment, a system for creating air capsules enclosing passengers in vehicles is disclosed. In one example, the system may include a gasper. The gasper may include an inlet port configured to intake airflow and an outlet port to direct the airflow into a passenger cabin. The system may further include a plurality of exhaust ports to discharge the airflow out of the passenger cabin. The system may further include an air capsule creating device. The air capsule creating device may include an attachment portion removably attached to the outlet port of the gasper. It should be noted that the attachment portion may be configured to receive the airflow from the outlet port of the gasper. The air capsule creating device may further include a diffuser portion integrated with the attachment portion. The diffuser portion may be configured to intake the airflow from the attachment portion. The diffuser portion may include a flow control portion. The flow control portion may be configured to generate at least one airflow stream from the airflow. It should be noted that a first airflow stream of the at least one airflow stream creates an air capsule that encloses a passenger in the vehicle. Further, the flow control portion may be configured to discharge the first airflow stream out of the passenger cabin through the plurality of exhaust ports.

In yet another embodiment, a method for creating air capsules enclosing passengers in vehicles is disclosed. The method may include receiving airflow from an outlet port of a gasper within a vehicle. The method may further include generating at least one airflow stream from the airflow. The method may further include creating a first airflow stream of the at least one airflow stream to form an air capsule enclosing a passenger in the vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
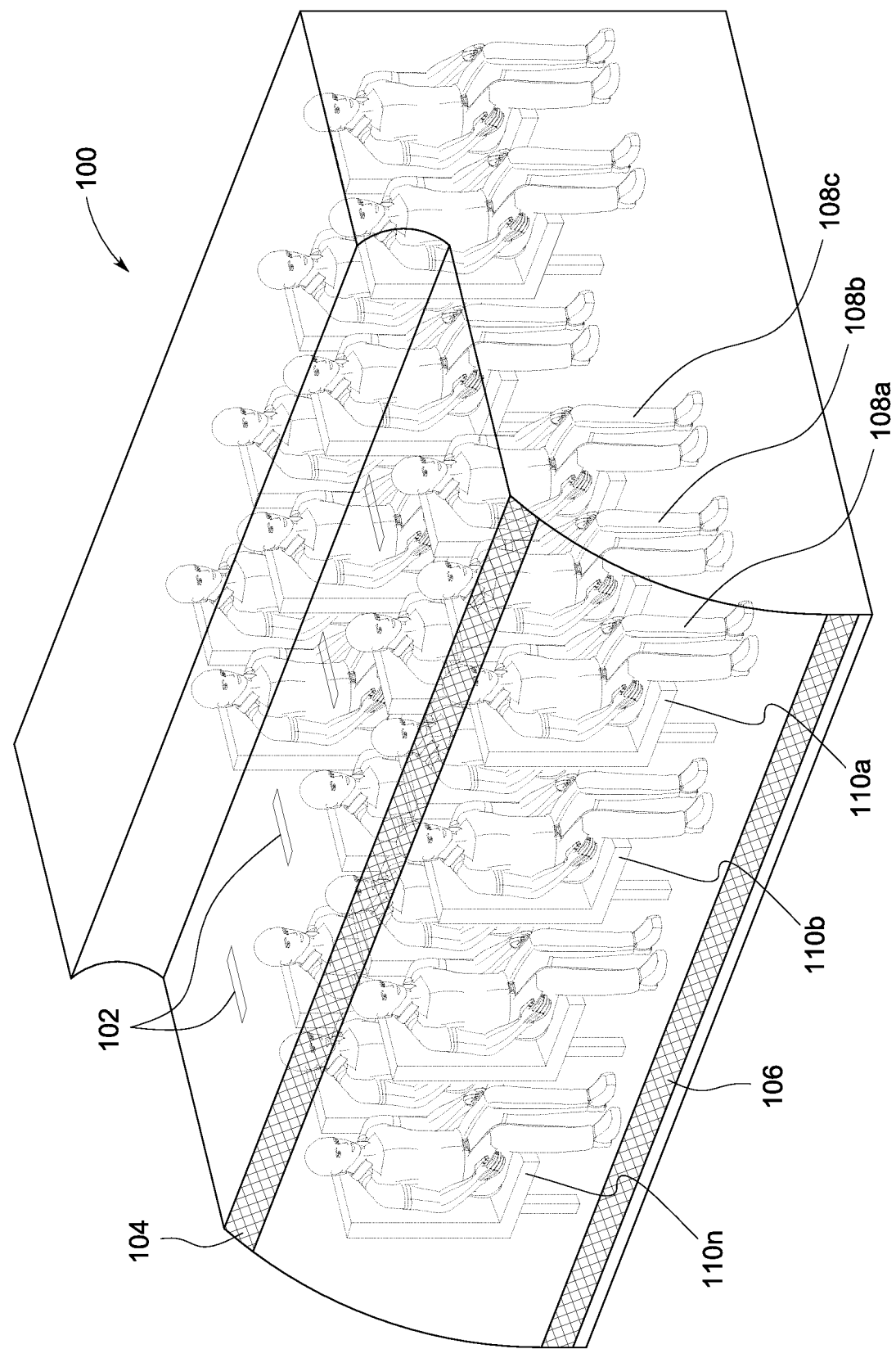
FIG. 1 illustrates an exemplary passenger cabin within a vehicle where various embodiments may be employed.

In FIG. 1, an exemplary passenger cabin 100 within a vehicle (not shown in FIG. 1) is illustrated, where various embodiments may be employed. The vehicle, for example, may be an aircraft, a train, or a bus. In FIG. 1, the vehicle is an aircraft. The passenger cabin 100 may include a plurality gaspers 102, a diffuser 104, a plurality of exhaust ports 106, and a plurality of passenger seats 108 (for example, a passenger seat 108a, a passenger seat 108b, and a passenger seat 108c). Further, the passenger cabin 100 may be divided into two or more sections. By way of an example, as illustrated in the FIG. 1, the passenger cabin 100 may be divided into two sections. The passenger cabin 100 may further include a plurality of rows 110 in both the sections, such that, in each of the plurality of rows 110 a plurality of passenger seats are fixed and arranged in a symmetrical manner. By way of an example, the plurality of rows 110 may include a first row 110a, a second row 110b, a last row 110n, and the like. Each of the plurality of rows 110 may include, but are not limited to, three passenger seats. For example, the first row 110a may include the passenger seats 108a, 108b, and 108c. The number of passenger seats and rows may vary depending upon size of the passenger cabin 100 and a vehicle type.

In some embodiments, the plurality of gaspers 102 may be attached to a ceiling of the passenger cabin 100, such that, each of the plurality of rows 110 may have at least one dedicated gasper. In some embodiments, a set of gaspers may be provided for each of the plurality of rows 110. Further, each of the plurality of gaspers 102 may include an inlet port and an outlet port (not shown in FIG. 1). It should be noted that the inlet port of a gasper may be configured to receive airflow. Environmental air may be drawn into the inlet port of the gasper. Alternatively, conditioned air may be drawn and injected into the inlet port of the gasper.

Further, the plurality of gaspers 102 may direct the airflow to the passengers. Each of the plurality of gaspers 102 may produce or create narrow air jets that may be focused or targeted on an associated passenger's head or body in order to provide thermal comfort. Additionally, in some embodiments, each of the plurality of gaspers 102 may include a rotatable ring or manual switch to control the amount of airflow in the air jets. Each of the plurality of gaspers 102 may also be movable or rotatable within respective enclosing sockets in order to control direction of the air jets.

The diffuser 104 may be a linear diffuser and may vary based on the vehicle type or architecture of the passenger cabin 100. Thus, the diffuser 104 may diffuse airflow into the passenger cabin 100 substantially along the length of the passenger cabin 100. It should be noted that the airflow generated by each of the plurality of gaspers 102 is relatively narrow and is controlled by passengers, when compared with the airflow of the diffuser 104. In some embodiments, the diffuser 104 may correspond to side vents. In order to expel or discharge cabin air inside the passenger cabin 100, the plurality of exhaust ports 108 may be provided near the floor of the passenger cabin 100 at a pre-defined distance from the aisle and the floor (not shown in FIG. 1) of the passenger cabin 100.

As will be apparent to a person skilled in art that an activity such as sneezing, coughing performed by an infected passenger may lead to transmission of contagious disease to co-passengers. By way of an example, the contagious disease may include, but are not limited to Coronavirus disease (COVID-19), Ebola virus disease, H1N1 infection, NIPAH virus infection, *Salmonella* infection, tuberculosis, and the like. When an infected person sneezes or coughs, high velocity air particles may be exhaled and may get mixed with the cabin air in a short duration. This exhaled air may be inhaled by other passengers in the same passenger cabin 100, thereby infecting one or more of these passengers. Therefore, there is a need to discharge the air, exhaled by each of the passengers, out of the passenger cabin 100 immediately before it mixes with the cabin air or is inhaled by other passengers. To achieve this, an air capsule creating device may be provided in some embodiments. This is further discussed in detail in conjunction with FIG. 2 to FIG. 10.

Figure 2:
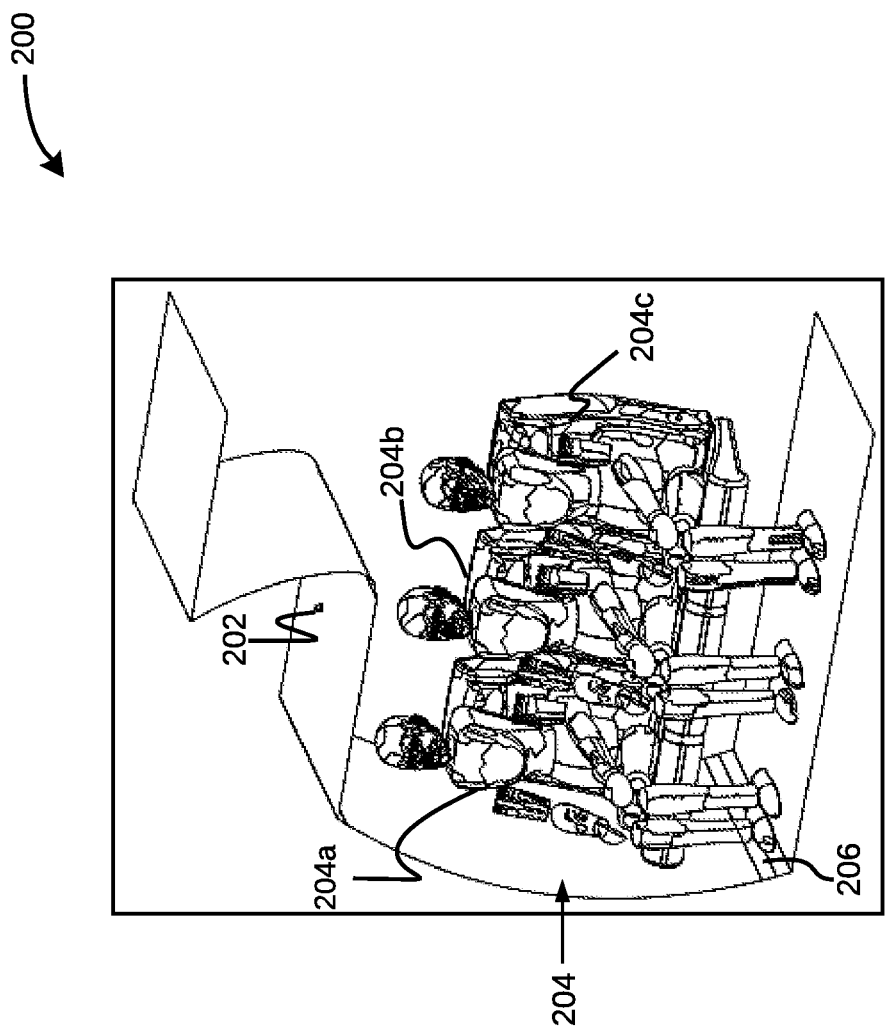
FIG. 2 illustrates an isometric view of a system for creating air capsules enclosing passengers within vehicles, in accordance with an exemplary embodiment.

Referring now to FIG. 2, an isometric view of a system 200 for creating air capsules enclosing passengers within vehicles is illustrated, in accordance with an exemplary embodiment. The system 200 may include a gasper 202, a row 204 (analogous to the first row 110a, the second row 110b, and the last row 110n), and a plurality of exhaust ports 206 (analogous to the plurality exhaust ports 106). The row 204 may further include three passenger seats, i.e., a first passenger seat 204a, a second passenger seat 204b, and a third passenger seat 204c. The first, second, and third passenger seats 204a, 204b, and 204c may be similar to the passenger seats 108a, 108b, and 108c. In an embodiment, an air capsule generating device (not shown FIG. 2) may be affixed to the gasper 202.

The gasper 202 may further include an inlet and an outlet port (not shown in FIG. 2). The inlet port may be configured to intake airflow and the outlet port may be configured to direct the airflow into the passenger cabin 100. Further, the air capsule creating device may be configured to generate at least one airflow stream from the airflow received from the outlet port. Subsequently, the air capsule creating device may create an air capsule (i.e., an air envelope or an air curtain) around a passenger using a first airflow stream of the at least one airflow stream, which is discussed in greater detail in conjunction with FIG. 3 to FIG. 10. The air capsule creating device may also generate a second airflow stream from the at least one airflow stream to provide thermal comfort to the passengers. Thus, in the system 200, a combination of the gasper 202 and the air capsule creating device may be used to maintain thermal condition within permissible limits for the passengers as well as to avoid the pathogen transmission among the passengers by creating air capsules around each passenger. The plurality of exhaust ports 206 may be used to flush the at least one airflow stream out of the passenger cabin 100. Thus, the cabin air is continuously cleared of any contamination, without letting the contaminated air particles spread within the passenger cabin 100.

In some embodiments, the system 200 may include three air capsule creating devices and each of these may generate an air capsule for each of the three passenger seats 204a, 204b, and 204c. In other words, the passengers occupying the passenger seats 204a, 204b, and 204c, may be enclosed by air capsules created by respective air capsule creating device. In an embodiment, a single air capsule creating device may create multiple air capsules. By way of an example, consider a situation where a passenger associated with the second passenger seat 204b is suffering from a communicable disease and may exhale air particles from mouth or nose while talking, sneezing, coughing, or performing any other similar activity. The communicable disease, for example, may include, but are not limited to Coronavirus disease (COVID-19), Ebola virus disease, H1N1 infection, NIPAH virus infection, *Salmonella* infection, tuberculosis, and the like. An air capsule created around a passenger contains or encloses air particles exhaled by the passenger, such that, the exhaled air particles do not end up contaminating air inhaled by co-passengers.

It should be noted that coughing and sneezing induce high velocity air particles which may spread in the passenger cabin 100 within a short duration of time. Thus, an air capsule creating device controls, contains, and prevents the spread of such particles. An air capsule created by the air capsule creating device by way of the first airflow stream may generate a high velocity air capsule around a passenger associated with each of the three passenger seats, i.e., the passenger seats 204a, 204b, and 204c. Now, for example, a passenger sitting on the second passenger seat 204b exhales air particles (by sneezing or coughing), since the air capsule associated with the second passenger seat 204b includes high velocity airflow stream (the first airflow stream), the air capsule may counter the velocity of the exhaled air particles immediately before it may reach other passengers sitting on the passenger seats 204a and 204c. Additionally, the air capsule associated with the second passenger seat 204b also prevents mixed cabin air from reaching the nose and mouth of the passenger sitting on the second passenger seat 204b. Thus, the air capsule protects or shields the passenger sitting on the second passenger seat 204b from inhaling the mixed cabin air, which may have been contaminated. Thus, the air capsule creating device enables passengers to travel in a densely packed passenger cabin 100.

Figure 3A:
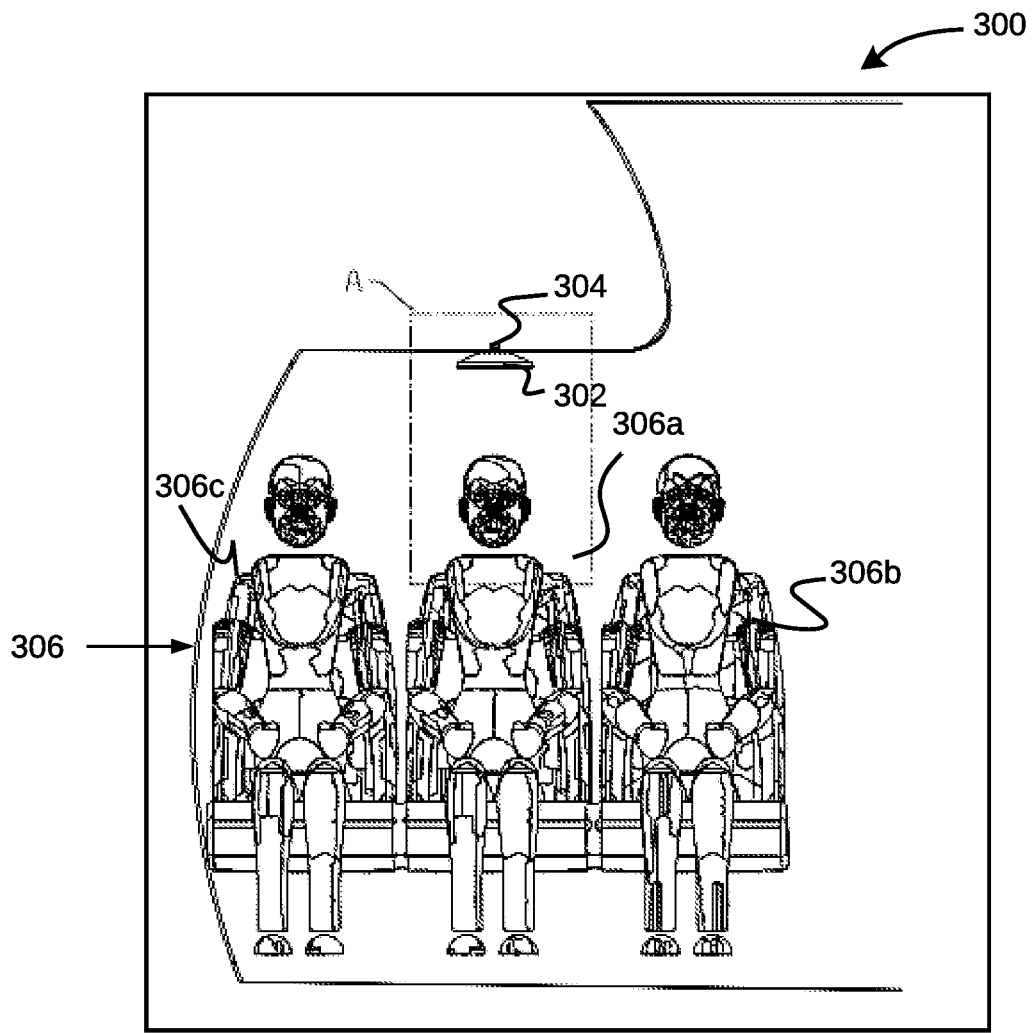
FIGS. 3A and 3B illustrate a front view of a system and a device configured to create air capsules enclosing passengers within vehicles, in accordance with an exemplary embodiment.
Figure 3B:
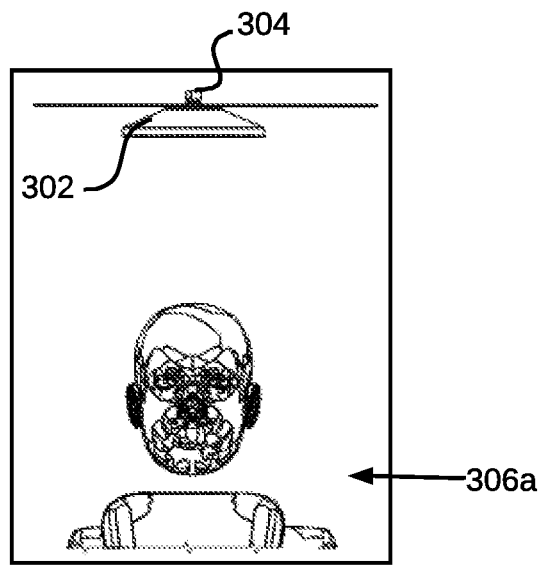

Referring now to FIGS. 3A and 3B, a front view of a system 300 and a device 302 configured to create air capsules enclosing passengers within vehicles is illustrated, in accordance with an exemplary embodiment. The device 302 is an air capsule creating device as disclosed in FIG. 2. The system 300 is analogous to the system 200 and includes the air capsule creating device 302, a gasper 304 (analogous to the gasper 202), and a passenger row 306 (analogous to the passenger row 204), as represented in FIG. 3A. It will be apparent to a person skilled in the art that the system 300 may include multiple gaspers, such that, there is one dedicated gasper for each passenger. Further, the passenger row 306 may include three passenger seats, i.e., passenger seats 306a, 306b, and 306c. The gasper 304 may include an inlet port to intake airflow and an outlet port to direct the airflow to the air capsule creating device 302.

In the passenger row 306, the passenger seat 306a is a middle seat, while the passenger seats 306b and 306c are respectively on the left and right side of the middle seat 306a. By way of an example, a first passenger may occupy the passenger seat 306a, a second passenger may occupy the passenger seat 306b, and a third passenger may occupy the passenger seat 306c. In one embodiment, the air capsule creating device 302 may create an air capsule enclosing the second passenger occupying the middle seat 306a. In a similar manner, there may be air capsule creating devices affixed to gaspers associated with each of the first passenger and the third passenger. In some other embodiments, the air capsule creating device 302 may create air capsules for each of the first, second, and third passengers. The system 300 may also include a plurality of exhaust ports (not shown in FIG. 3A) similar to the plurality of exhaust ports 206, which may not be visible in the front view of the system 300.

The air capsule creating device 302 shown in FIGS. 3A and 3B may include an attachment portion (not shown in FIGS. 3A and 3B) and a diffuser portion (not shown in FIGS. 3A and 3B). The attachment portion may be configured to be removably attach to the gasper 304. In other words, the air capsule creating device 302 is detachable and the attachment portion is used to connect the outlet port of the gasper 304 to the diffuser portion. The attachment portion may receive airflow from the outlet port of the gasper 304 and may direct the airflow to the diffuser portion. The diffuser portion may be configured to intake the airflow from the attachment portion.

Further, the diffuser portion may include a flow control portion, which may be configured to generate at least one airflow stream from the airflow. The flow control portion may include at least one flow channel, which may be configured to split the airflow into the at least one airflow stream. In some embodiments, the at least one flow channel splits the airflow into two airflow streams. Additionally, the at least one flow channel is configured to increase the flow rate of each of the at least one airflow stream.

In some embodiments, the flow control portion of the diffuser portion may generate a first airflow stream and a second airflow stream. The first airflow stream may create an air capsule around a passenger, thereby preventing transmission of pathogens exhaled by the passenger, to other passengers. The air capsule may have high velocity and momentum, which may deaccelerate or completely stop air particles exhaled by the passenger. In some other embodiments, the flow control portion may generate the second airflow stream. The second airflow stream may be a narrow jet of air and may be configured to control thermal conditions around the passenger and to deliver adequate oxygen to the passenger. It should be noted that flow direction of the first airflow stream and the second airflow stream is towards a floor of a passenger cabin (for example, the passenger cabin 100). It should also be noted that the second airflow stream is enclosed within the first airflow stream and is configured to be directed at the passenger.

Further, the flow control portion may include a circumferential lip (not shown in FIG. 3A). The circumferential lip may circumferentially contain the first airflow stream to maintain the air capsule.

FIG. 3B is a close view of the second passenger occupying the middle seat 306a with the air capsule creating device 302 attached with the gasper 304 overhead the second passenger. By way of an example, the air capsule creating device 302 may generate two airflow streams, i.e., the first airflow stream and the second airflow stream. In other words, the air capsule creating device 302 may split the airflow coming out of the gasper outlet port into two airflow streams. The two airflow streams may be further directed towards the second passenger occupying the middle seat 306a. With regards to the two airflow streams, the first airflow stream may create the air capsule around the second passenger, thereby preventing the transmission of air exhaled by the second passenger to the first passenger and third passenger. The second airflow stream may offer thermal comfort and adequate oxygen to the second passenger. Further, the two airflow streams may be discharged out of the passenger cabin 100 via the plurality of exhaust ports provided at a pre-defined distance from the floor of the passenger cabin 100.

Figure 4B:
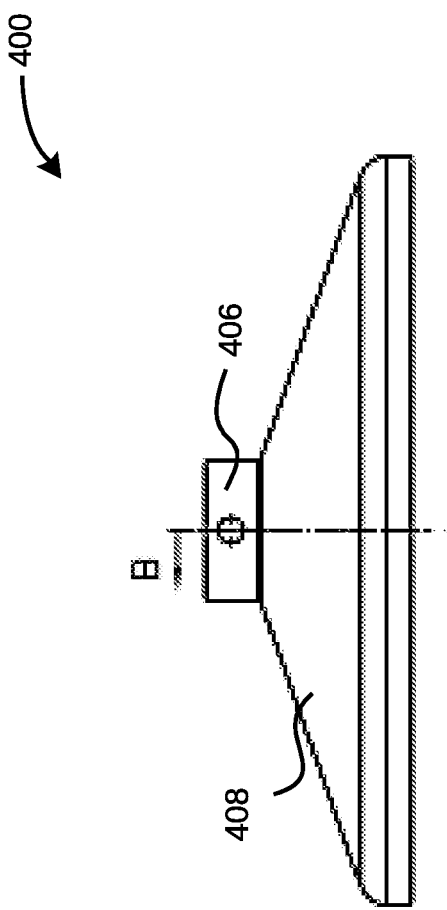
FIGS. 4A-4C illustrate multiple views of an air capsule creating device, in accordance with an exemplary embodiment.
Figure 4C:
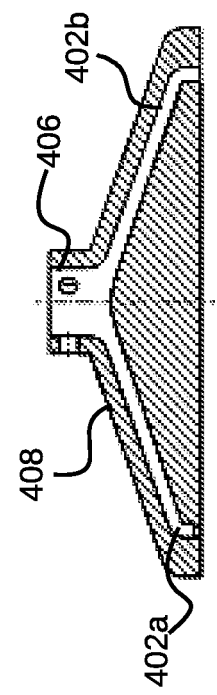
Figure 4A:
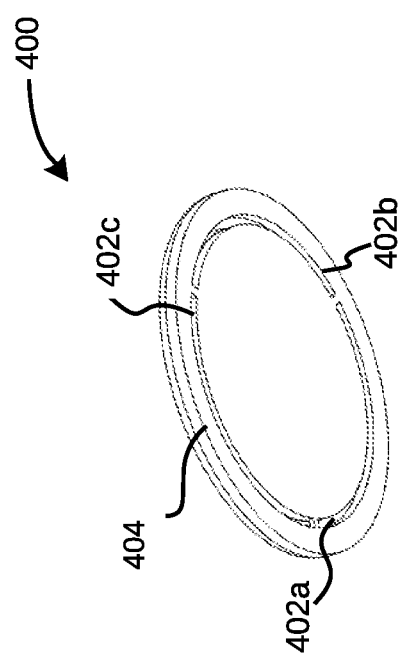

Referring now to FIGS. 4A to 4C, multiple views of an air capsule creating device 400 are illustrated, in accordance with an exemplary embodiment. FIG. 4A is a bottom view of the air capsule creating device 400. The air capsule creating device 400 includes flow channels 402a, 402b, and 402c. It will be apparent to a person skilled in the art that though the flow channels 402a, 402b, and 402c are depicted as being separate, they may form a single contiguous flow channel 402, in some embodiments. Further, the air capsule creating device 400 may include a circumferential lip 404. The flow channels 402a, 402b, and 402c may split the airflow received from a gasper into the at least one airflow stream. Additionally, the flow channels 402a, 402b, and 402c may increase the flow rate of each of the at least one airflow stream. The circumferential lip 404 may circumferentially contain the first airflow stream in order to maintain the air capsule. In an embodiment, the flow channels 402a, 402b, and 402c only create a first airflow stream from the airflow received by the gasper.

FIG. 4B is a side view of the air capsule creating device 400. The side view of the air capsule creating device 400 depicts an attachment portion 406 and a diffuser potion 408. The attachment portion 406 is detachably connected to a gasper (for example, the gasper 304) and the diffuser portion 408 includes the flow channels 402a, 402b, and 402c. As discussed before, the attachment portion 406 is configured to receive the airflow from an outlet port of the gasper and to further supply the airflow to the diffuser portion 408. Internal architecture of the diffuser portion 408 is depicted by a cross-sectional view of the air capsule creating device 400, in FIG. 4C. The cross-sectional view of the air capsule creating device 400 depicts the attachment portion 406, the diffuser portion 408, and the flow channels 402a and 402b.

Figure 5:
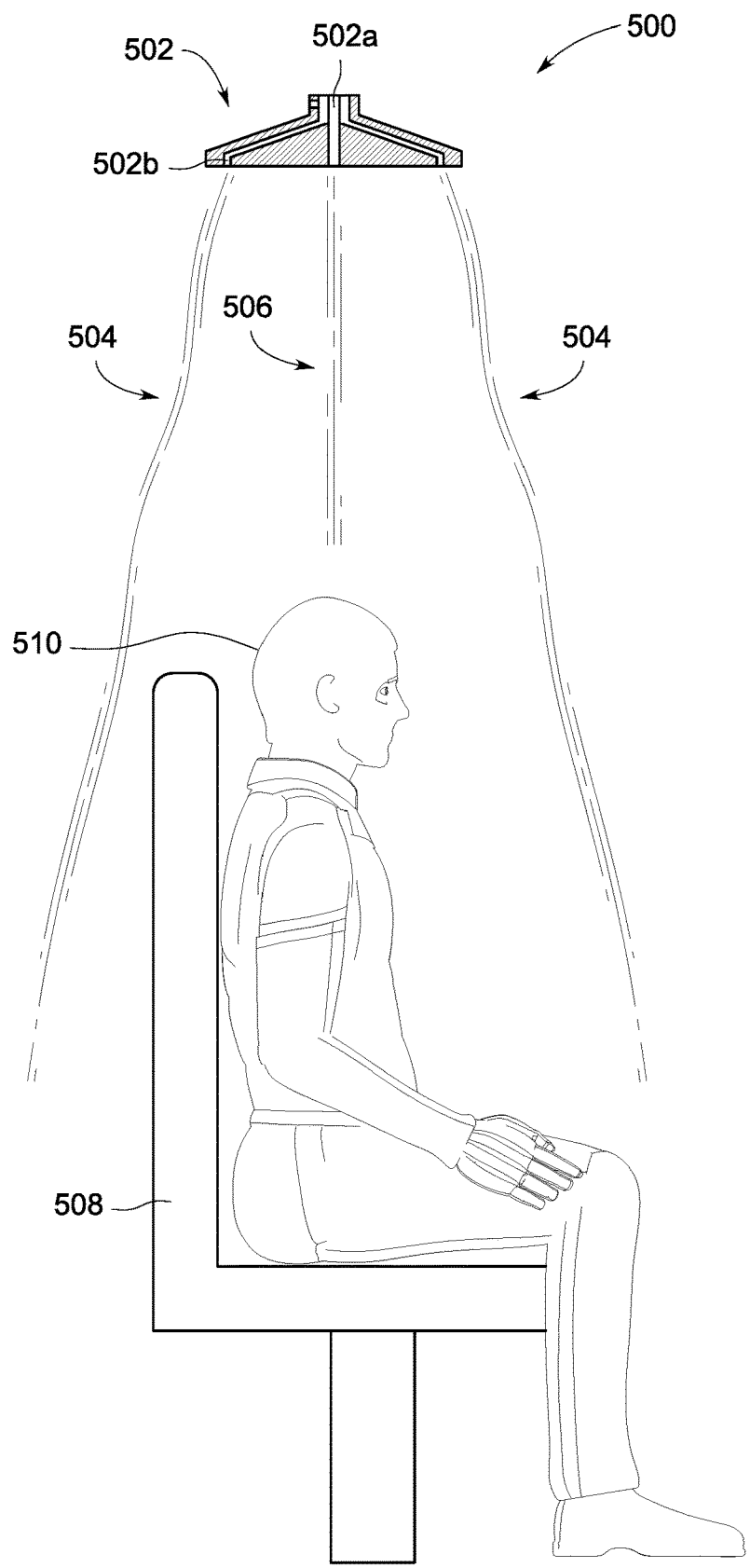
FIG. 5 illustrates a side view of functioning of an air capsule creating device configured to create an air capsule enclosing a passenger within a vehicle, in accordance with an exemplary embodiment.

Referring now to FIG. 5, a side view 500 of functioning of an air capsule creating device 502 configured to create an air capsule enclosing a passenger within a vehicle is illustrated, in accordance with an embodiment. The air capsule creating device 502 creates two airflow streams (i.e., a first airflow stream 504 and a second airflow stream 506) from an airflow received from a gasper (for example, the gasper 304). This is different from the air capsule creating device 400, which only creates the first airflow stream. The air capsule creating device 502 creates the first airflow stream 504 and the second airflow stream 506 above a passenger seat 508, which is occupied by a passenger 510. The air capsule creating device 502 may further include an attachment portion 502a and a diffuser portion 502b. The attachment portion 502a of the air capsule creating device 502 may receive airflow from the gasper and the attachment portion 502a may then direct the airflow to the diffuser portion 502b. Thereafter, the diffuser portion 502b that includes a flow control portion (not shown in FIG. 5) may generate the first airflow stream 504 and the second airflow streams 506.

By way of an example, the passenger 510 may be travelling via an aircraft during an epidemic situation. It may be apparent that the passenger seat 508 is positioned in a densely packed passenger cabin within the aircraft. The passenger 510 may also be suffering from a contagious disease, such as, Coronavirus disease (COVID-19), Ebola virus disease, H1N1 infection, NIPAH virus infection, *Salmonella* infection, tuberculosis, or the like.

Now, the passenger 510 may sneeze or cough, thereby exhaling out pathogen containing air particles. These pathogens containing air particles may further mix with the cabin air in the aircraft and may affect other passengers in the passenger cabin. However, due to presence of the air capsule creating deice 502, the pathogen containing air particles may be directly discharged out of the cabin without mixing with the cabin air. The second airflow stream 506 may be directed at head or body of the passenger 510 to provide adequate oxygen and thermal comfort to the passenger 510. The first air flow stream 504 may be directed at high velocity in such a way that the first air flow stream may form an air capsule (for example, of a conical shape) around the passenger 510. Consequently, the first airflow stream 504 may interact or collide with the pathogen containing air particles when exhaled by the passenger 510. As a result, the first airflow stream 504 contains the pathogen containing air particles within the air capsule and avoids pathogen transmission within the passenger cabin. The first airflow stream 504 also contains the second airflow stream 506. The flow control portion in the diffuser portion 502b directs the first airflow stream 504, the second airflow stream 506 and consequently the pathogen containing air particles towards the floor of the passenger cabin, where a plurality of exhaust ports (for example, the plurality of exhaust ports 206) are provided. The plurality of exhaust ports may discharge the first airflow stream 504, the second airflow stream 506, and the pathogen containing air particles out of the passenger cabin. Thus, the air capsule creating device 502 prevents transmission of any communicable disease from the passenger 510 to other passengers within the aircraft.

In another scenario, one of the passengers sitting beside the passenger 510 may be suffering from a communicable disease. When that passenger sneezes, coughs, or otherwise exhales air particles while conversing with someone, the passenger 510 may get infected by inhaling air particles exhaled by the infected passenger. However, the air capsule creating device 502 associated with the infected passenger sitting beside the passenger 510 may prevent the transmission in a similar way as discussed above.

Figure 6A:
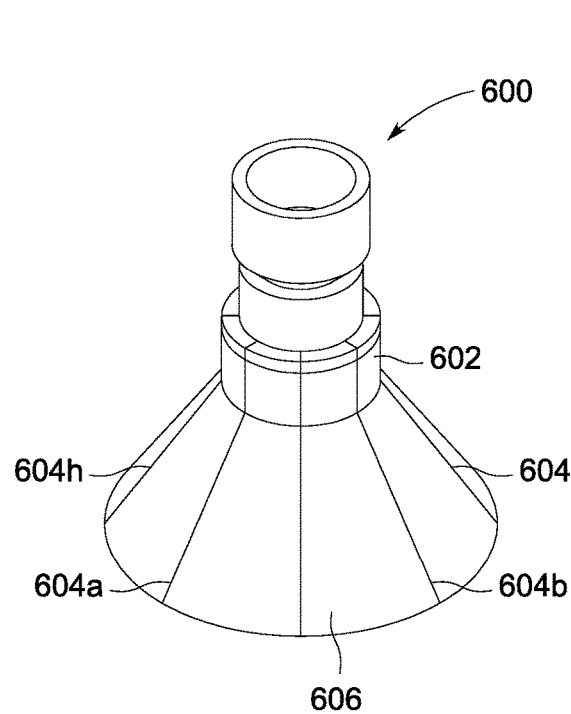
FIGS. 6A-6D illustrate multiple views of another air capsule creating device configured to create an air capsule, in accordance with an exemplary embodiment.
Figure 6B:
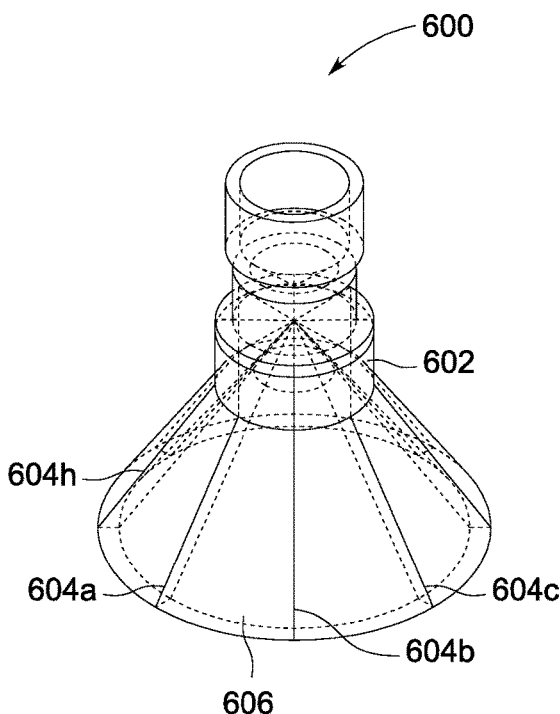

Referring now to FIGS. 6A to 6D, multiple views of an air capsule creating device 600 are illustrated, in accordance with an exemplary embodiment. FIGS. 6A and 6B are isometric views of the air capsule creating device 600. The isometric views depict an attachment portion 602 that may be detachable and connected to a gasper (for example, the gasper 304), and a diffuser portion. The diffuser portion includes flow guide vanes 604a, 604b, 604c, and 604h. In some embodiments, a flow guide vane may correspond to a flow straightener. The flow guide vanes 604a, 604b, 604c, and 604h may be selected from, but are not limited to, a tube-type, a fin-type, a vortab type, a zanker type, and a disturbance plate type flow guide vane. In the air capsule creating device 600, the fin type flow guide vanes are represented. In some embodiments, the flow guide vanes

604a, 604b, 604c, and 604h, may be employed within a diffuser portion of the air capsule creating device 600 to improve the flow profile of airflow streams. This makes the air capsule creating device 600 different from the air capsule creating device 400. It may be apparent to a person skilled in art that the flow guide vanes 604a, 604b, 604c, and 604h may help in directing the airflow stream at a predefined angle through the flow channels. Further, the diffuser portion may include multiple flow channels (for example, a flow channel 606) between a pair of flow guide vanes from the flow guide vanes 604a, 604b, 604c, and 604h (visible in FIGS. 6A and 6B), 604d, 604e, 604f, and 604g (visible in FIG. 6C).

Figure 6C:
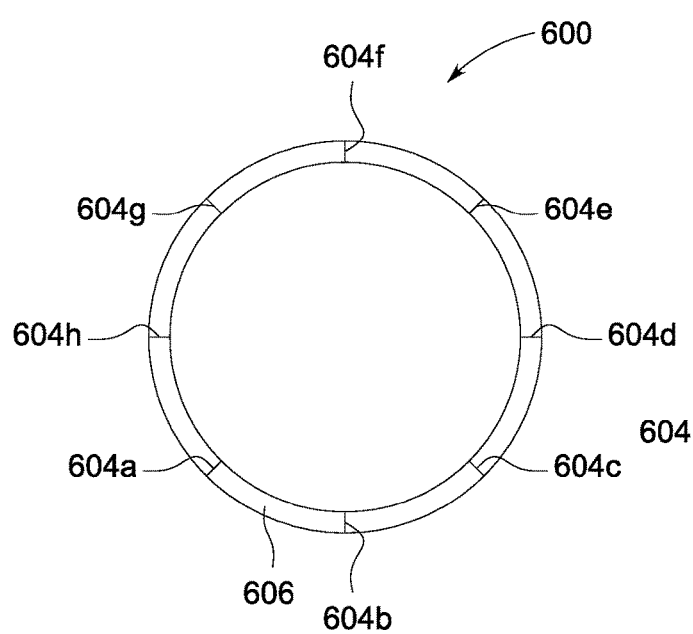
Figure 6D:
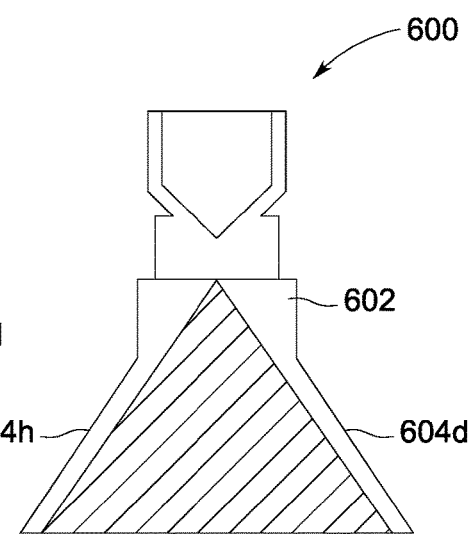

FIG. 6C is a bottom view of the air capsule creating device 600. The bottom view of the air capsule creating device 600 illustrates all the flow guide vanes within the diffuser portion, for example the flow guide vanes 604a, 604b, 604c, 604d, 604e, 604f, 604g, and 604h. Further, the bottom view also represents flow channels between a pair of flow guide vanes from the plurality of flow guide vanes 604a, 604b, 604c, 604d, 604e, 604f, 604g, and 604h. For example, the flow channel 606 between the flow guide vanes 604a and 604b is depicted in FIG. 6C. Internal construction of the air capsule creating device 600 is depicted by a cross-sectional view, in FIG. 6D. The cross-sectional view of the air capsule creating device 600 depicts the attachment portion 602, and the diffuser portion including flow guide vanes 604h and 604d.

Figure 7A:
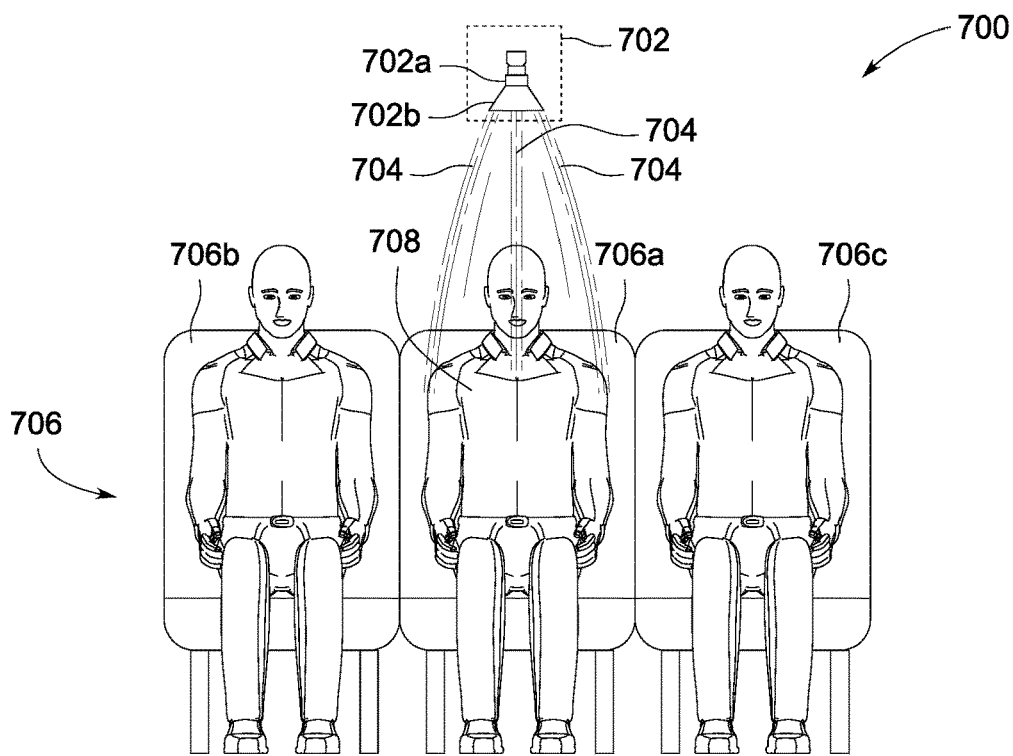
FIGS. 7A-7B illustrate a front view of functioning of another air capsule creating device configured to create an air capsule enclosing a passenger within a vehicle, in accordance with an exemplary embodiment.
Figure 7B:
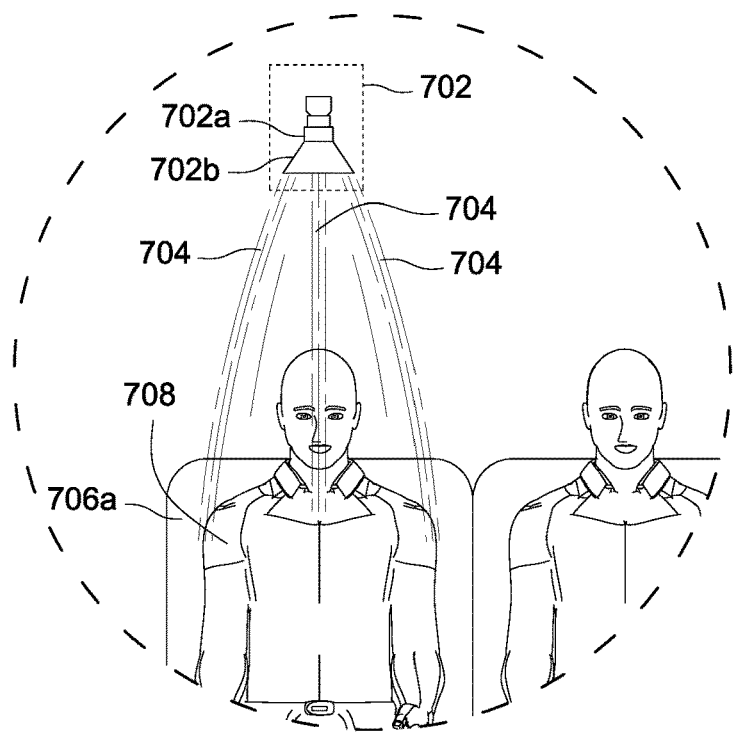

Referring now to FIGS. 7A and 7B, a front view 700 depicting functioning of an air capsule creating device 702 configured to create an air capsule enclosing a passenger within a vehicle is illustrated, in accordance with an exemplary embodiment. The air capsule creating device 702 includes an attachment portion 702a and a diffuser portion 702b. The attachment portion 702a may transmit airflow coming out of a gasper to the diffuser portion 702b. Internal construction of the air capsule creating device 702 is similar to the air capsule creating device 600. Therefore, the diffuser portion 702b includes multiple flow guide vanes (similar to the flow guide vanes 604a, 604b, 604c, 604d, 604e, 604f, 604g, and 604h) and flow channels (such as, the flow channel 606). Number of flow guide vanes and the flow channels may vary depending upon size of the diffuser portion 702b. The diffuser portion 702b may generate a first airflow stream 704 and a second airflow stream. The second airflow stream is not visible in FIGS. 7A & 7B and this is same as the second airflow stream 506. The front view 700 further depicts a passenger row 706 that includes three passenger seats 706a, 706b, and 706c. Further, the passenger seat 706a may be occupied by a passenger 708. The first airflow stream 704 and the second airflow stream may be directed towards the passenger 708. The first airflow stream 704 may cover the passenger 708 like an air sheet or an air capsule. This proper covering may be possible due to the flow guide vanes that directs the airflow streams exactly at a predefined angle towards a passenger. The predefined angle may be selected based on a predetermined requirement. Therefore, the flow guide vanes inside the diffuser portion 702b may enhance efficiency of the air capsule creating device 702 to create air capsules. It may be noted that the first airflow stream 704 may protect the passenger 706a from communicable disease transmission.

FIG. 7B is a closer view of the passenger 708 occupying the seat 706a with the air capsule creating device 702 attached to a gasper overhead the second passenger 708. The air capsule creating device 702 may include the attachment portion 702a and may generate two airflow streams, i.e., the first airflow stream 704 and the second airflow stream. The two airflow streams may be further directed towards the passenger 708 occupying the seat 706a. With regards to the two airflow streams, the first airflow stream 704 may create an air capsule around the passenger 708, thereby preventing the transmission of air exhaled by the passenger 708 to the neighboring passengers occupying seats 706b and 706c. The second airflow stream may offer thermal comfort and adequate oxygen to the second passenger.

Figure 8:
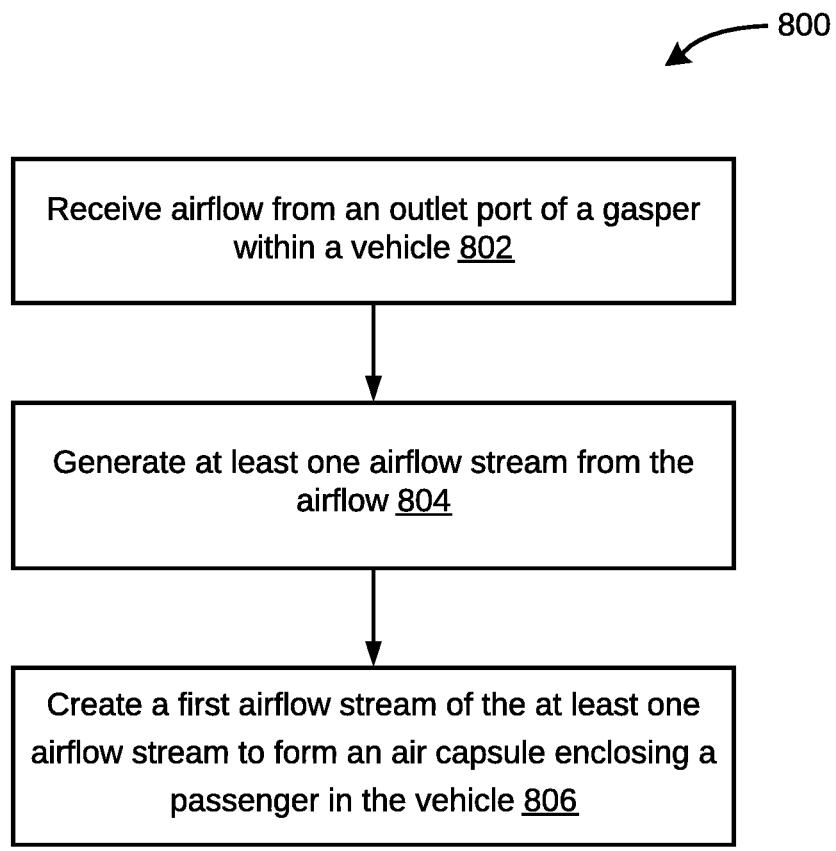
FIG. 8 is a flowchart of a method for creating air capsules enclosing passengers in vehicles, in accordance with an embodiment.

Referring now to FIG. 8, a method 800 for creating air capsules enclosing passengers within vehicles is depicted via a flowchart, in accordance with an embodiment. Each step of the method 800 may be executed by an air capsule creating device (analogous to the air capsule creating devices 302 and 502). At step 802, an airflow may be received from an outlet port of a gasper (similar to the gaspers 102, 202, and 304) within a vehicle. At step 804, at least one airflow stream may be generated from the airflow. At step 806, a first airflow stream (similar to the first airflow stream 504) of the at least one airflow stream may be created. It should be noted that the first airflow stream may form an air capsule that encloses a passenger within the vehicle. In an embodiment and as explained in conjunction with FIG. 9, a second airflow stream (similar to the first airflow stream 504) of the at least one airflow stream may also be created.

Figure 9:
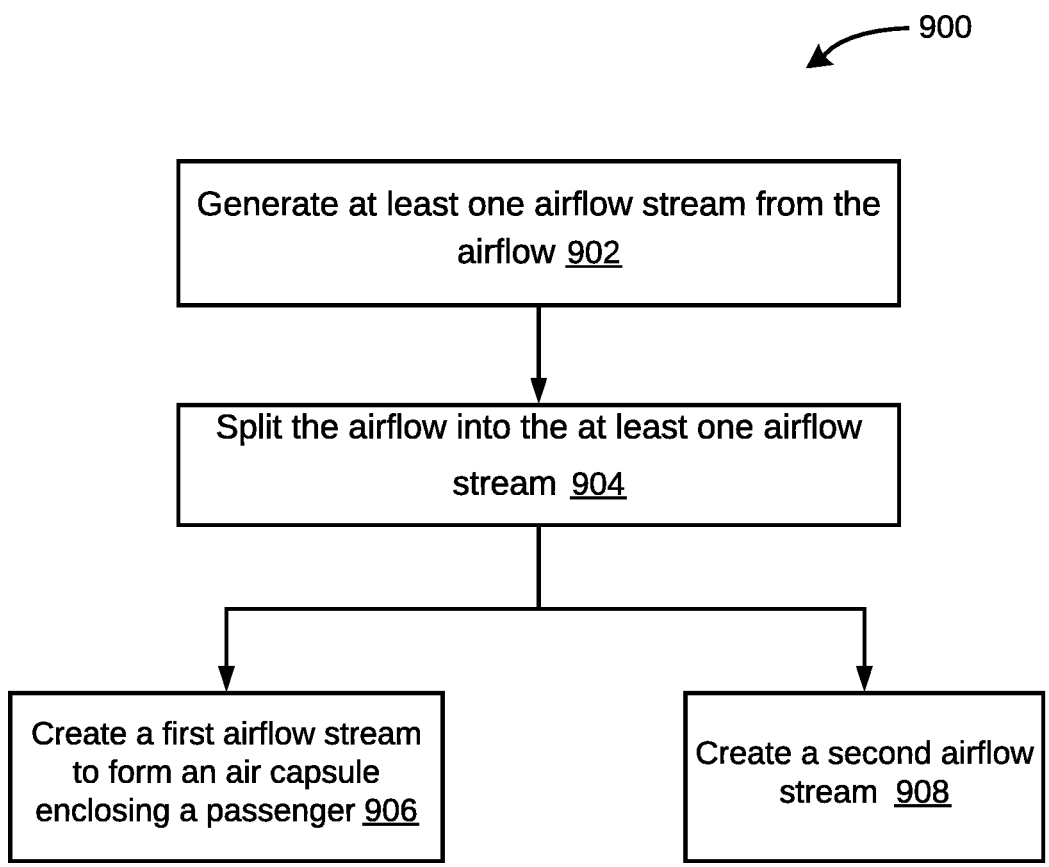
FIG. 9 is a flowchart of a method for creating first and second airflow streams from an airflow, in accordance with an embodiment.

Referring now to FIG. 9, a method 900 for creating first and second airflow streams from the airflow is depicted via a flowchart, in accordance with an exemplary embodiment. At step 902, at least one airflow stream may be generated from an airflow by a diffuser portion of an air capsule creating device (analogous to the air capsule creating devices 302 and 502). At step 904, the airflow may be split into the at least one airflow stream via a flow channel within the air capsule creating device. It should be noted that at least one flow channel within the air capsule creating device may split the airflow. It should also be noted that each of the at least one flow channel increases the flow rate of each of the at least one airflow stream.

At step 906, a first airflow stream (similar to the first airflow stream 504) of the at least one airflow stream may be generated. It should also be noted that the first airflow stream may form an air capsule of high velocity enclosing a passenger within the vehicle. In some embodiments, the air capsule formed by the first airflow stream may contain exhalation by the passenger within the air capsule. At step 908, a second airflow stream (similar to the second airflow stream 506) may be created. The second airflow stream may control thermal conditions around the passenger and may deliver adequate oxygen to the passenger.

Figure 10:
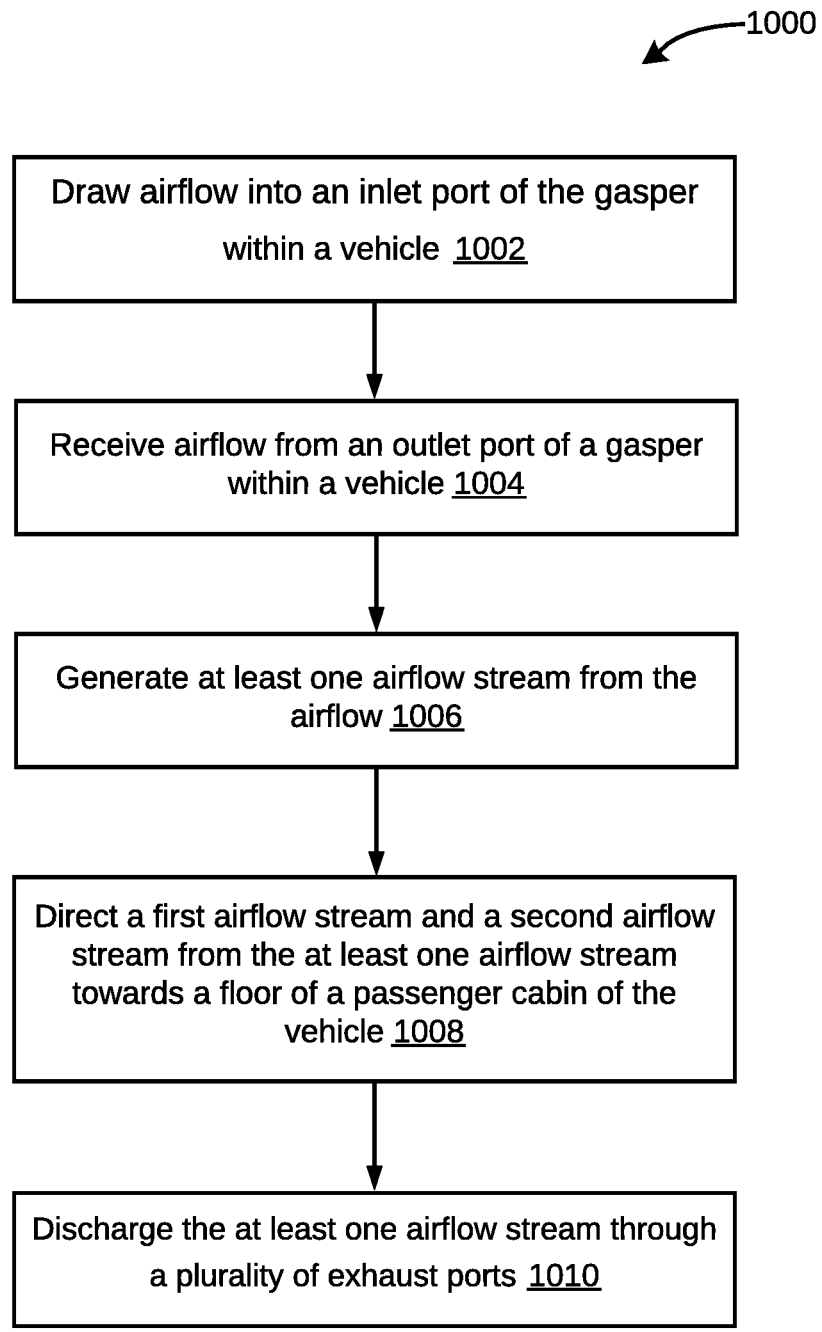
FIG. 10 is a flowchart of a method for discharging pathogens out of a passenger cabin, in accordance with an embodiment.

Referring now to FIG. 10, a method 1000 for discharging pathogens out of the passenger cabin 100 is depicted via a flowchart, in accordance with an embodiment. At step 1002, an airflow may be drawn into an inlet port of a gasper (similar to the gaspers 102, 202, and 304). At step 1004, the airflow may be received by the air capsule creating device (analogous to the air capsule creating devices 302 and 502) from the outlet port of the gasper. At step 1006, at least one airflow stream may be generated from the airflow by a diffuser portion of the air capsule creating device. The at least one airflow stream may include a first airflow stream (similar to the first airflow stream 504) and a second airflow stream (similar to the second airflow stream 506). At step 1008, the first airflow stream and the second airflow stream from the at least one airflow stream may be directed towards a floor of a passenger cabin of the vehicle.

It should be noted that the second airflow stream may be enclosed within the first airflow stream. In some embodiments, the second airflow stream may be directed at the passenger to control thermal conditions around the passenger and to deliver adequate oxygen to the passenger. Additionally, in some other embodiments, the first airflow stream may be directed around the passenger to form an air capsule enclosing the passenger and to contain exhalation by the passenger within that air capsule. At step 1010, the at least one airflow stream may be discharged out of the passenger cabin through a plurality of exhaust ports (similar to the plurality of exhaust ports 106 and 206).

As will further be appreciated by those skilled in the art, current systems lack the mechanism to efficiently mitigate transmission of pathogenic microorganisms in densely packed spaces and are mostly focused on filters and thermal comfort. The techniques described above provide for creating air capsule around passengers in vehicles. In particular, the above techniques provide for preventing communicable disease transmission by enclosing the passengers within a high velocity airflow stream (air capsule). Additionally, the techniques provide for diffusing the airflow received from gaspers at some predefined angles and velocity such that the airflow suppresses the air jets exhaled by passengers (which may contain pathogens) and pushes it downwards to discharge airflow along with the air jets exhaled by passengers directly outside a closed space (for example, passenger cabin).

The specification has described a device, system, and method for creating air capsules enclosing passengers in vehicles. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope of disclosed embodiments being indicated by the following claims.

What is claimed is:

1. A device for creating air capsules enclosing passengers in vehicles, the device comprising:

an attachment portion configured to:

removably attach to a gasper within a vehicle; and receive airflow from an outlet port of the gasper; and a diffuser portion integrated with the attachment portion, wherein the diffuser portion is configured to intake the airflow from the attachment portion, and wherein the diffuser portion comprises:

a flow control portion configured to generate at least one airflow stream, through one or more flow channels, from the airflow received from the outlet port of the gasper, wherein at least one flow channel may split the airflow and increase the flow rate of each of the at least one airflow stream; and wherein the at least one airflow stream creates an air capsule, and wherein the air capsule completely and circumferentially encloses a passenger from all sides; and a circumferential lip configured to circumferentially contain the at least one airflow stream to maintain the air capsule, wherein the circumferential lip begins at the outer periphery of the one or more flow channels and wherein the circumferential lip extends away from a central axis of the device.

2. The device of claim 1, wherein the flow control portion further comprises:

at least one flow channel configured to split the airflow into the at least one airflow stream, and wherein each of the at least one flow channel is configured to increase the flow rate of each of the at least one airflow stream;

at least one flow guide vane configured to direct the at least one airflow stream at a predefined angle; and a circumferential lip configured to circumferentially contain the first airflow stream to maintain the air capsule.

3. The device of claim 2, wherein flow direction of the first airflow stream and a second airflow stream from the at least one airflow stream is towards a floor of a passenger cabin of the vehicle, and wherein the second airflow stream is enclosed within the first airflow stream and is configured to be directed at the passenger.

4. The device of claim 3, wherein each of the first airflow stream and the second airflow stream is discharged out of the passenger cabin through a plurality of exhaust ports in the passenger cabin.

5. The device of claim 4, wherein the plurality of exhaust ports is provided at a predefined distance from the floor of the passenger cabin.

6. The device of claim 3, wherein the second airflow stream is configured to control thermal conditions around the passenger and to deliver adequate oxygen to the passenger.

7. The device of claim 1, wherein the first airflow stream is configured to contain exhalation by the passenger within the air capsule.

8. The device of claim 1, wherein the vehicle comprises one of an aircraft, a train, or a bus.

* * * * *